(12) United States Patent
Miller et al.

(10) Patent No.: US 10,269,012 B2
(45) Date of Patent: Apr. 23, 2019

(54) SYSTEMS AND METHODS FOR SECURE AND PRIVATE COMMUNICATIONS

(71) Applicant: SWFL, Inc., Reno, NV (US)

(72) Inventors: Jeremie Miller, Reno, NV (US);
Thomas Muldowney, Reno, NV (US);
Allison Clift-Jennings, Reno, NV (US)

(73) Assignee: SWFL, Inc., Reno, NV (US)

( * ) Notice: Subject to any disclaimer, the term of this patent is extended or adjusted under 35 U.S.C. 154(b) by 112 days.

(21) Appl. No.: 15/345,392

(22) Filed: Nov. 7, 2016

(65) Prior Publication Data
US 2017/0134937 A1 May 11, 2017

Related U.S. Application Data

(60) Provisional application No. 62/252,306, filed on Nov. 6, 2015.

(51) Int. Cl.
H04K 1/00 (2006.01)
G06Q 20/38 (2012.01)
(Continued)

(52) U.S. Cl.
CPC ......... *G06Q 20/3829* (2013.01); *G06Q 20/06* (2013.01); *G06Q 20/065* (2013.01); *H04L 9/0637* (2013.01); *H04L 9/0861* (2013.01); *H04L 9/14* (2013.01); *H04L 9/30* (2013.01); *H04L 9/3236* (2013.01); *H04L 9/3297* (2013.01); *H04L 63/0428* (2013.01); *H04L 63/083* (2013.01); *H04L 67/12* (2013.01); *H04W 12/02* (2013.01); *H04W 12/04* (2013.01); *H04W 12/06* (2013.01); *G06Q 2220/00* (2013.01); *H04L 63/061* (2013.01); *H04L 2209/38* (2013.01); *H04L 2209/56* (2013.01);
(Continued)

(58) Field of Classification Search
CPC ........... H04L 2209/80; H04L 2209/805; H04L 2209/56; H04L 63/0428; H04L 63/061; H04L 9/0637; H04L 9/0861; H04L 9/14; H04L 9/30; H04L 9/3236; H04L 9/3247
USPC ........................................................ 380/270
See application file for complete search history.

(56) References Cited

U.S. PATENT DOCUMENTS 7,417,983 B2* 8/2008 He ...................... H04L 12/1822 370/260
2005/0256925 A1* 11/2005 Luo ...................... H04L 12/1822 709/204
(Continued)

OTHER PUBLICATIONS

Telehash, V3 See Publication Date on p. 7, "Apr. 7, 2015".*
Telehash Protocol (v2.1-pre), Publication Date: Aug. 10, 2014.*

*Primary Examiner* — Samson B Lemma
(74) *Attorney, Agent, or Firm* — Jeffrey Schox; Padowithz Alce

(57) ABSTRACT

A system and method implementing secure radio communications in a decentralized network includes: a handshake with one other of the plurality of nodes; establishing a point-in-time reference parameter during the handshake, wherein the point-in-time reference parameter is identified at the end of the handshake with the one other node; identifying a window in randomly sequence of rotating windows based on the point-in-time reference parameter, wherein the identified window contains a channel for conducting an encrypted communication with the one other node; and establishing the communication channel with the one other node.

20 Claims, 4 Drawing Sheets

(51) Int. Cl.
*H04L 9/06* (2006.01)
*H04L 9/14* (2006.01)
*H04L 9/30* (2006.01)
*H04L 9/32* (2006.01)
*H04L 29/06* (2006.01)
*H04W 12/04* (2009.01)
*H04W 12/06* (2009.01)
*H04L 29/08* (2006.01)
*H04W 12/02* (2009.01)
*H04L 9/08* (2006.01)
*G06Q 20/06* (2012.01)

(52) U.S. Cl.
CPC .... *H04L 2209/80* (2013.01); *H04L 2209/805* (2013.01)

(56) References Cited

U.S. PATENT DOCUMENTS

2007/0060141 A1* 3/2007 Kangude ............. H04W 74/002
455/445
2010/0260153 A1* 10/2010 Hollick ................ H04L 47/724
370/336

* cited by examiner

SYSTEMS AND METHODS FOR SECURE AND PRIVATE COMMUNICATIONS

CROSS-REFERENCE TO RELATED APPLICATIONS

This application claims the benefit of U.S. Provisional Application No. 62/252,306, filed 6 Nov. 2015, which is incorporated in its entirety by this reference.

TECHNICAL FIELD

The inventions of the present application relate generally to the electronic connectivity and communications fields, and more specifically to improved systems and methods for implementing secure and private communications between devices.

BACKGROUND

In many centralized systems, many devices across great and small distances can achieve heightened levels of connectivity and interaction without being physically connected to each other and thus, are able to connect and communicate with one another wirelessly. These centralized systems for connecting these devices, however, are accompanied with several disadvantages that limit connectivity in remote locations, limit the autonomy of the devices operating in the centralized systems, and therefore, do not allow for optimal connectivity, autonomous transacting, and communications between and through the devices.

Additionally, due to the inherent lure of abuse and exploitation by centralized systems, all of these economic elements, digital and physical, with existing systems or new products, must be fundamentally autonomous and distributed in nature in order to maximize their potential. It is only in autonomous and distributed environment that markets can naturally emerge, balanced and maximizing benefit for all those involved.

The commonly referred to proposal to evolve the Internet to optimize for the "Internet of Things" has become synonymous with connected thermostats, pet collars, and toothbrushes. While the ability to build connectivity between devices like these is novel, there is a possibility that it may not realize the full potential of digitally connecting the physical world of things together. When a device can only connect with similarly-manufactured devices, and each of them can only connect with their manufacturer-approved cloud service, and thus, the vast majority of value that the device could have provided over its lifetime is severely hindered since it is strictly tied to a cloud-based interaction platform.

These new economic actors—e.g., the devices themselves—must be principally independent actors from centralized authority (e.g., manufacturers and connectivity servers) to unlock the vast majority of value associated therewith. Including—and especially—from the manufacturers of the devices themselves. It can be a very risky proposition to continue to give central authority, whether a nation state or a corporation, the reach and control capable of this new type of connected device. These autonomous and fully interconnected devices should retain full control and complete privacy at the device providing the coupling and creating the economic value.

But in order to realize such prospective technical environments where devices are independent actors; the technical functions involved in connectivity including discovery, interacting, and even transacting value between devices and with people, the entire protocol stack, systems, and methods governing these technical functions must be re-evaluated from the ground up. Thus, there is a need in the device connectivity and communication field to create new and useful systems and methods for implementing an environment for interactivity of autonomous devices without or independent of a central authority for governing interaction there between and consequently, enhancing the levels and quality of connectivity achievable with such networks and devices.

DESCRIPTION OF THE PREFERRED EMBODIMENTS

Figure 1:
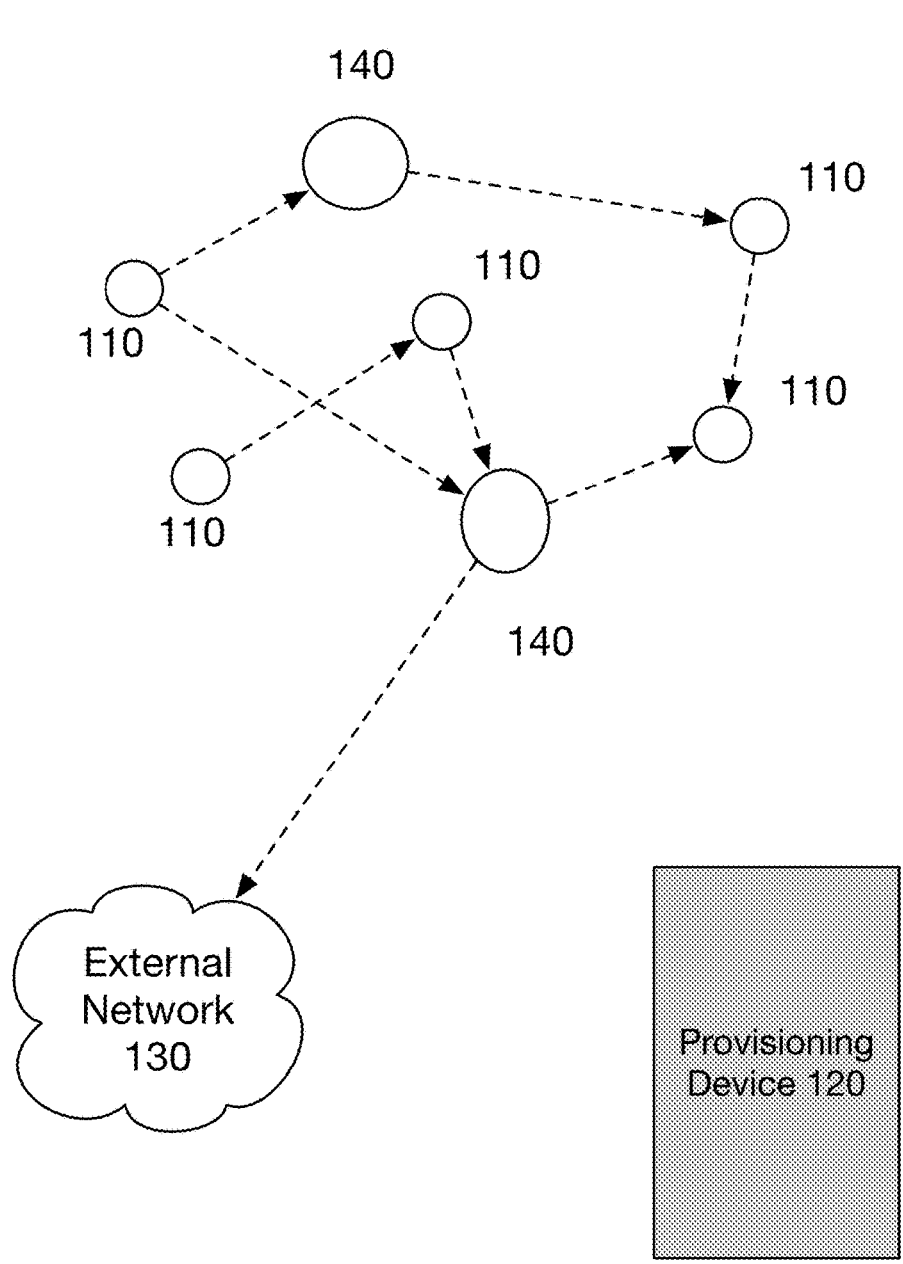
FIG. 1 is a schematic representation of a system of a preferred embodiment of the present application.

The following description of the preferred embodiments of the inventions are not intended to limit the inventions to these preferred embodiments, but rather to enable any person skilled in the art to make and use these inventions.

DIST Protocols

In the present application, a set of protocols called Distributed Sentient Transactions (DIST), are implemented in the systems and methods described herein to provide a minimum set of requirements necessary to realize autonomous, decentralized devices.

In addition to the capabilities described of DIST and other novel protocols described herein, there are two fundamental requirements that are cornerstone for implementing a truly decentralized connected device environment. The baseline of these requirements revolve around security and privacy.

Security and privacy as two concepts that are sometimes used interchangeably, and while these concepts are related, they are not the same thing. For instance, in the realm of connectivity devices, security entails guaranteeing that the identity given to a device and the information transmitted by and between devices are what the device(s) states it is, without tampering, interference, and modification within transit, at the time of transmission, and/or at the time of receipt. Security sometimes also includes enciphering information so that the information is not readable by any other entity but the sender and receiver. Privacy, on the other hand, entails preventing others outside of the intended recipient to gain information related to or about the transaction or transmission between two devices or parties. Exploiting privacy could be as simple as eavesdropping, or as sophisticated as deep-packet inspection or timing attacks to determine additional information about the transaction or transmission. Thus, in order for devices to be truly autonomous, they must also have enough basic capabilities, at the device level, in both privacy and security to mitigate their vulnerabilities to security and privacy attacks that would otherwise render the devices disabled or ineffective for their intended purposes with the simplest effort (e.g., hacking).

Accordingly, DIST weaves security and privacy throughout the entire collection of protocols that make up the composition for DIST. While DIST protocols, in some embodiments, reduce efficiencies in some processes, the benefit obtained by enhanced security and privacy far outweigh the drawbacks in efficiencies. A fundamental assumption, in many embodiments described herein, is that any hardware the DIST stack of protocols runs on will have access to a hardware cryptographic co-processor to securely generate, manage, and store cryptographic keys—and when necessary, to accelerate computation-intensive encipher and decipher processing and to ensure tamper-resistant cryptographic code. Security must be trusted at the lowest level of the hardware of the device, or it is possible that all higher-level promises of security and privacy become indefensible.

Privacy must also be adhered to at the very lowest levels. Telehash protocol is a primary communication protocol in the DIST protocol stack, and along with a sub-protocol of Telehash called TMesh, Telehash protocols provide maximized communication privacy between any two endpoints. Therefore, under such protocols, encrypted communication is enforced, no metadata is ever leaked in communications and the operations of devices, and perfect forward secrecy is required.

The DIST protocol has been designed to run on a myriad of hardware platforms, from laptops and embedded computers all the way down to microcontroller-based systems such as wearables and wireless sensors. Thus, it shall be understood that DIST protocol can be run and/or applied to any type of device or element with sufficient computational and/or processing abilities to execute DIST protocols.

Blockname: Discovery Operation

Before any decentralized interaction between parties (e.g., devices) can happen, there must first be a means or method to ensure both the identity and the discoverability of a party. Identity of a party (e.g., an endpoint or node) focuses specifically on the verifiability that a party is who they say they are. Discovery focuses on the ability to find the network location of the party, given a known identifier of that party. Blockname primarily works to solve the discovery problem. But it also solves the identity verifiability problem in concert with Telehash—the secure communication protocol.

Blockname works on a novel premise, which is: leverage almost all of the existing Domain Name System (DNS) infrastructure that is currently used for Internet name resolution for domain names to Internet protocol (IP) addresses. Except, instead of relying on ICANN and its 13 root name server delegates to be the final source-of-truth, replace the 13 root name server delegates with the Bitcoin blockchain or other digital ledger technologies operating without a central administrator. Blockname uses the blockchain as a replacement start of authority (SOA) for normal DNS resolution, as well as to resolve alternative domains and custom top-level domains (TLDs). Blockname provides identity and discovery in a completely distributed manner—no registrars, root servers, or central authorities required further enabling the autonomy of the devices operating thereunder.

Blockname solves an underlying issue with existing name resolution and decentralization. DNS is not fundamentally decentralized in that at its root, there is a federation of 13 servers run by a loose conglomerate of organizations, under the singular ICANN DNS Root Server System Advisory Committee. However, this root zone is actually controlled by governmental entities. The government entities approve all changes to the root zone file as requested by 1.

In order to replace the role of ICANN in Blockname, there exists a notion of notaries. Notaries are a collection of individuals or organizations who vouch for the authenticity of names posted within a Blockname-based system. Notaries can use several means or methods to guarantee authenticity, from traditional ways such as confirming business licenses or personal identities to using already-established means to confirm identity, such as SSL certificate authorities (CAs). To prevent land-grabs and squatting, it is expected that the earliest notaries will leverage existing efforts from SSL certificate authorities in order to bootstrap Blockname. As the Blockname protocol matures and sees greater use, notaries will likely expand to use additional means to validate identities.

On the software side, a Blockname Resolver is provided which acts like a traditional DNS cache and recursive resolver. Blockname Resolver will resolve all queries via regular DNS first, and only when those queries fail will Blockname Resolver use any names that come from the blockchain-based hints. In this mode, Blockname always acts as a backup for any existing valid DNS names and only provides additional resolution for unregistered domains or unsupported Top-Level Domains (TLDs).

In the background, Blockname Resolver continuously indexes all newly broadcast blockchain transactions that have a valid hint—any OP_RETURN starting with a *—storing only the unique hints that have the largest values associated with them. The value of the hint's own output— what could be considered the "burned" value in Satoshis— must be larger for the new hint to replace a previous one of the same name. In this way, an old host name or IP address can be updated by simply creating a new blockchain transaction with a higher value assigned to it. Since a Satoshi is 1/100,000,000 of a Bitcoin, it is extremely low cost to update Blockname records.

The other software component, the Blockname Notary, verifies that the newly broadcast Blockname transactions are from an authorized agent of that name. It shall be noted that the Blockname Resolver will have a list of valid notaries in it—much like web browsers have a list of valid certificate authorities that are used to confirm authenticity for web site SSL certificates. Each Blockname Resolver instance can modify the list of valid notaries, but a default list is also provided.

While individual device names and subdomains can both use Blockname, they may not scale well depending on how the combination is utilized. Inefficiencies arise if it is attempted to store every device identity inside the blockchain directly. Larger namespaces, such as a custom TLDs, are formed by designated public Blockname resolvers advertising their existence to each other and building a distributed hash table (DHT) index for a TLD from those advertisements. The DHT index is then used to dynamically resolve any names with that TLD, allowing for ephemeral and alternative uses on a custom TLD that do not require a transaction per name or traditional DNS registration.

Telehash: Secure Communication Protocol

Once verifiable identity and lookup capabilities are available through Blockname, Telehash allows devices to establish secure communication directly with each other. Telehash, simply put, is a lightweight network protocol with strong encryption to enable communication across multiple transports and platforms. A lightweight interoperable protocol with strong encryption to enable mesh networking across multiple transports and platforms. Each endpoint generates its own unique public-key based address (e.g., a hashname) to send and receive small encrypted packets of JSON (with optional binary payloads) to other trusted endpoints. An endpoint may also provide routing assistance to others for bridging across different transports and to help negotiate direct peer-to-peer links.

Encryption is end-to-end, and is required one hundred percent (100%) of the time. It is impossible to disable encryption in Telehash. There is strict privacy, where no content, metadata or identity is ever revealed to third-parties. Telehash runs well on embedded, mobile, and desktop computing classes of hardware. Several underlying transport protocols are supported, so Telehash can run cleanly on top of very common networking protocols currently in use today. Lastly, there are many native implementations of Telehash supporting a large number of programming languages.

Telehash could be considered a next generation iteration of the best parts of the XMPP protocol. XMPP is a protocol created by Jabber to facilitate instant messaging between entities in a federated manner. Federation is similar to decentralization, except that in XMPP's case, federation means that anyone could run their own instant messaging server, and servers could communicate with each other. Instant messaging clients would connect to servers to send messages to each other on their clients' behalf. This was a much better model than the silos of the day—most notably AOL Instant Messenger (AIM). At the height of XMPP's popularity, over 1 billion people used it daily to communicate. Both Google Chat and Facebook Messenger used it as their messaging protocol. However, federation led to consolidation over time. Early on, there were thousands of XMPP servers, and as time went on, the number of servers decreased to just a dozen or so.

Telehash takes the best parts of XMPP, and addresses the deficiencies found by having XMPP deployed at such a large scale. The most important changes Telehash brings are in the areas of protocol verbosity, privacy, and addressing the drawbacks of a federated model.

As computing has become increasingly powerful and efficient, protocol verbosity is not so much a problem as it used to be. The size of the protocol packets, the amount of processing required to encode and decode the packets, and the overall compute overhead required to run that protocol are all less of a problem for today's devices than they used to be. However, in this new era of connected devices (e.g., nodes)—many of which are extremely low power and compute (e.g., low computer processing capabilities) capability, a lightweight protocol is actually more important now than it used to be. Telehash can run on devices as small as ARM Cortex M0+ class: a 32-bit microcontroller running at 48 MHz with 32 kB of SRAM. No floating point processor and no memory controller is necessary. Because of the proliferation of low-power connected devices, Telehash must be able to run across all devices natively in order to allow true end-to-end communication. It is important to note that, in device classes as small as these, it is often beneficial to leverage a hardware-based crypto-accelerator chip, not only to increase cryptography performance, but for secure key storage as well. A crypto-accelerator chip can be integrated or otherwise, included in a number of different manners of a circuit board. A significant purpose of the crypto-accelerator chip, as alluded to above, is to load off very computing intensive tasks of encryption/decryption and compression/decompression. In such cases, the acceleration is often achieved by doing particular arithmetic calculations in the hardware. Accordingly, by including a crypto-accelerator chip in addition to a microcontroller and/or cryptographic coprocessor on a device, significant computing efficiencies can be achieved without necessarily having to increase the size of a small device having the processors and chips thereon.

In terms of privacy, XMPP originally did not handle privacy considerations at all. Only at a later time was work done with integrating Off-The-Record$_2$ (OTR) functionality into XMPP. OTR brought strong encryption, authentication, deniability, and perfect forward secrecy to XMPP. Telehash handles these capabilities natively within its protocol, without the need to have OTR functionality built on top of it. By performing these OTR-type functionalities natively in Telehash provides a significant benefit of computing efficiencies by a computer processor since there is only one protocol to be process for a secure and private communication rather than using two disparate protocols in combination.

Lastly, a federated model may be insufficient, as it has been seen with XMPP. True end-to-end networking is necessary to avoid the consolidation of federated systems as seen in the XMPP environment. The consolidation of the federated systems in the XMPP environment raises the same and/or similar issues apparent in systems having a central authority. Specifically, systems having central authorities governing, managing, or otherwise interacting with multiple devices may be compromised and therefore, affecting multiple and if not all devices in a network. This configuration should be avoided to mitigate the possibility of compromise.

Before getting into the underlying process of Telehash, a relevant terms glossary is provided in the following paragraphs which may be helpful when discussing the operation of Telehash, to avoid confusion with other network protocols.

Packet refers or relates to an encapsulated format for JavaScript Object Notation (JSON) and binary data using an encoding format that allows combined JSON and binary data Hashname refers or relates to an endpoint identifier, calculated from its public key Endpoint, which refers or relates to a participant in the Telehash network identified by a single hashname.

Message refers or relates to an asynchronous encrypted packet between two endpoints; Channel, which refers or relates to a virtual stream that allows two endpoints to exchange data reliably or unreliably.

Chunking refers or relates to a packet is chunked into smaller pieces for low-MTU or streaming transports.

Cloaking (or Masking) refers or relates to method used to hide Telehash traffic on the wire by randomizing all data sent in a network of endpoints.

Exchange refers or relates to the currently encrypted session state between two endpoints; Handshake, which refers or relates to a message type used to establish an encrypted session for channels; Link, which refers or relates to a connection between two endpoints either directly or via a router; Mesh, which refers or relates to a number of links with active encrypted sessions over any transport; participants in the mesh are called endpoints.

Router refers or relates to an endpoint that will facilitate link setup between two other endpoints; Transport—underlying network responsible for packet transfer.

The core entity in a Telehash network is the endpoint. Endpoints can be embedded devices, web browsers, mobile phone apps, or server daemons. They are simply the original sender, or the final recipient of any communication. Each endpoint has a globally unique 32-byte or similar-sized address, called a hashname. This hashname is how endpoints identify themselves and other endpoints.

Endpoints establish secure communication with other endpoints by first establishing a link—either directly or through a router. These links can use any available underlying network transports such as User Datagram Protocol (UDP), (Transmission Control Protocol) TCP, or even Bluetooth, short-range communications (e.g., radio), long-range sub-gigahertz radio, or a combination thereof. Once the link is established between the endpoints, a handshake message occurs to create a secure exchange on the link between the endpoints.

Once this secure link is established, one or more channels can be established on this link. A channel is analogous to a traditional network socket.

Once one or more channels are established securely, packets are passed between them directly. A collection of links to many endpoints is considered a mesh.

When an endpoint does not already know how to find another endpoint, it will request help from a router. The router will facilitate a link setup between the two endpoints. Once the link is set up, the router is no longer a part of the link, and the two endpoints can continue to establish links directly until one or the other is no longer at the same network address.

TMesh is a sub-protocol of the Telehash system, that extends Telehash functionality onto low power, low bandwidth radio links. TMesh is uniquely designed to be a secure physical (PHY) and Media Access Control (MAC) protocol for long-range, sub-Gigahertz mesh networking. It brings the same secure, private end-to-end networking to the smallest of embedded devices that Telehash offers in more powerful hardware, but works within the typically high latency and low bandwidth that these very long-range radio transceivers exhibit.

Accordingly, TMesh is the composite of three distinct layers, the physical radio medium encoding (PHY), the shared management of the spectrum (MAC), and the networking relationships between two or more endpoints (Mesh).

A community is any set of endpoints that are using a common medium definition and have enough trust to establish a Telehash link for sharing peers and acting as a router to facilitate larger scale meshing. Within any community, the endpoints that can directly communicate over a medium are called neighbors, and any neighbor that has a higher z-index is always considered the current leader that may have additional responsibilities.

To provide proper context additional definitions of terms used with TMesh are provided: medium refers and/or relates to a definition of the specific channels/settings the physical transceivers of endpoints use; community refers and/or relates to a network of endpoints using a common medium to create a large area mesh; neighbors refers and/or relates to nearby reachable endpoints in a same community; z-index refers and/or relates to a self-asserted resource level (e.g., available power capacity, available memory, and other capacities of the limited capabilities associated with an endpoint) from any endpoint; leader refers and/or relates to a highest z-index endpoint in any set of neighbors; knock refers and/or relates to a single transmission; window refers and/or relates to a variable period in which a knock is transmitted, $2^{16}$ to $2^{32}$ microseconds (<100 ms to >1 hr); and window sequence refers and/or relates to each window will change frequency/channels in a sequence.

Regarding context about PHY, a medium is a compact 5 byte definition of the exact PHY encoding details required for a radio to operate. The 5 bytes are always string encoded as 8 base32 characters for ease of use in JSON and configuration storage, an example medium is azdh.pa5r which is 0xo6, 0x46, 0x77, 0x83, 0xb1.

Byte 0 is the primary type that determines if the medium is for a public or private community and the overall category of PHY encoding technique to use. The first/high bit of byte 0 determines if the medium is for public communities (bit 0, values from 0-127) or private communities (bit 1, values from 128-255). The other bits in the type map directly to different PHY modes on transceivers or different hardware drivers entirely and are detailed in the PHY section.

Byte 1 is the maximum energy boost requirements for that medium both for transmission and reception. While an endpoint may determine that it can use less energy and optimize its usage, this byte value sets an upper bar so that a worst case can always be independently estimated. The energy byte is in two 4-bit parts, the first half for the additional TX energy, and the second half for the additional RX energy. While different hardware devices will vary on exact mappings of mA to the 1-16 range of values, effort will be made to define general buckets and greater definitions to encourage compatibility for efficiency estimation purposes.

Each PHY driver uses the remaining medium bytes 2, 3, and 4 to determine the frequency range, number of channels, spreading, bitrate, error correction usage, regulatory requirements, channel dwell time, and similar details on the transmission/reception. The channel frequency hopping and transmission window timing are derived dynamically and not included in the medium.

Transmitted payloads do not generally need whitening as encrypted packets are by nature DC-free. They also do not explicitly require CRC as all Telehash packets have authentication bytes included for integrity verification.

A single fixed 64 byte payload can be transmitted during each window in a sequence, this is called a knock. If the payload does not fill the full 64 byte frame the remaining bytes must contain additional data so as to not reveal the actual payload size.

WIP—determine a standard filler data format that will add additional dynamically sized error correction, explore taking advantage of the fact that the inner and outer bitstreams are encrypted and bias-free (Gaussian distribution divergence?).

Each transmission window can go either direction between endpoints, the actual direction is based on the parity of the current nonce and the binary ascending sort order of the hashnames of the endpoints. A parity of 0 (even) means the low endpoint transmits and high endpoint receives, whereas a parity of 1 (odd) means the low endpoint receives and high endpoint transmits.

Regarding MAC, there is no endpoint addressing or other metadata included in the transmitted bytes, including there being no framing outside of the encrypted ciphertext in a knock. The uniqueness of each knock's timing and PHY encoding is the only endpoint addressing mechanism.

Every window sequence is a unique individual encrypted session between the two endpoints in one community using a randomly rotating nonce and a shared secret key derived directly from the medium, community name, and hashnames. All payloads are additionally encrypted with the ChaCha20 cipher before transmission regardless of if they are already encrypted via Telehash.

Each endpoint should actively make use of multiple communities to another endpoint and regularly test more efficient mediums to optimize the overall energy usage. Every endpoint advertises their current local energy availability level as a z-index (single byte value) to facilitate community-wide optimization strategies.

There are two mechanisms used for enabling a larger scale mesh network with TMesh, communities (MAC layer) and routers (Telehash/app layer).

A community is defined by endpoints using a shared medium and the automatic sharing of other neighboring endpoints that it has active windows with in that medium. Each neighbor endpoint hashname is listed along with next nonce, last seen, z-index, and the signal strength. An endpoint may be part of more than one community but does not share neighbor endpoint information outside of each one.

The leader is always the neighbor with the highest z-index reachable directly, this is the endpoint advertising that it has the most resources available. The leader inherits the responsibility to monitor each neighbor's neighbors for other leaders and establish direct or bridged links with them.

Any endpoint attempting to connect to a non-local hashname will use their leader as the Telehash router and send it a peer request, whom will forward it to the next highest leader it is connected to until it reaches the highest in the community. That highest resourced leader is responsible for maintaining an index of the available endpoints in the community. Additional routing strategies should be employed by a mesh to optimize the most efficient routes and only rely on the leaders as a fallback or bootstrapping mechanism.

Any endpoint that can provide reliable bridged connectivity to another network (wifi, ethernet, etc) should advertise a higher z-index and may also forward any Telehash peer request to additional Telehash router(s) in the mesh via those networks.

Overview

Ushering in a new era revolving around IoT or generally, digital connectivity of things (DGoT) requires a robust system for connectivity and in the view of the present application, robust methods and systems for implementing secure and private connectivity with or involving those devices and other elements that enable an IoT or DGoT environment are disclosed. In this context, arises the several inventive concepts disclosed herein which provide novel and nonobvious techniques and systems which shore up the gaps in security and privacy that exist when IoT devices and the like connect and communicate with one another. By shoring up the security and privacy gaps in these devices, enhances the autonomy of the devices to operate without a central authority (e.g., a central server or the like) that may be used to manage the device's privacy and security considerations.

In a typical IoT environment, there may be data capturing devices and/or operational devices, such as sensors and/or actuators which gather information associated with a machine (e.g., a thing) and connect to other sensors and/or actuators to communicate the gathered information. In this basic example of an IoT environment, the transmissions of the sensors and/or actuators may be susceptible to attacks which aim to absorb observable information about the transmission and absorb the gathered information being transmitted and often, information about the devices, themselves. Thus, with the prevalence of meta data attacks and meta data surveillance to wrongfully obtain information from IoT connectivity devices, such as the sensor and/or actuator, raises an immediate concern particularly with communications between IoT devices that are performed over radio frequency. This is because with radio frequency communications there is not a network access point that you have to worry about gathering meta data from; rather, a real immediate concern is that anybody and/or any receiver in proximity to the radio range of the radio frequency communication can surveil the communication and record all of the radio frequency communication in the air. There is virtually no way to detect whether a receiver is surveilling and/or recording the radio communication; however, if an entity chooses to invest heavily in physical security it may be possible to mitigate the opportunities others have to monitor and capture radio frequency communication information between devices. This approach, however, may be extremely expensive and cost prohibitive.

Thus, in a system that includes thousands of devices communicating with each other over radio frequency, the issues involving wrongful surveillance and information capture is magnified even greater. This is problematic because any kind of information including data management patterns, device management patterns, sensor recording, sensor data patterns, type of sensors, when schedules run, actuation timing and schedules, and the like can become exposed from the meta data associated with radio frequency traffic. Simply put, the wrongful surveillance and/or capture of meta data from radio frequency communications allows the surveilling entity to identify communication packets which have the information of interest since the meta data in a radio frequency transmission usually or possibly describes the general contents of the communication packets. Once the general contents of the communication packets are known, an entity who is surveilling the radio transmissions can then allocate resources to hacking or wrongfully obtaining the specific contents of the communication packets. This situation can be substantially mitigated or otherwise, completely avoided by diminishing, disguising, obfuscating, or mitigating to a zero meta data state any useful meta data that can be obtained by mere surveillance in a radio transmission between two communicating parties. A zero meta data of a preferred embodiment is a state in which at least two endpoints in a mesh network or otherwise, which are establishing a link, linked, or communicating with each do not reveal any kind of meta data to a surveilling entity, such that zero meta data is exposed. A zero meta data state ensures that the patterns, schedules, and communication packets of the network of endpoints are securely and privately protected.

Accordingly, there are three main recordable and/or surveillable meta data attributes of a radio frequency communication between at least two communicating parties that the embodiments of the present application seek to protect using the systems, methods, and protocols described herein. A first attribute that the embodiments seek to protect include the channel (e.g., frequency) of communication of a transmission, a second attribute includes a signal strength (e.g., the loudness of the transmission or power) of a communication and/or a signal strength emanating from the parties or devices involved in the radio transmission, and the time of the radio transmission including a start time, duration of transmission (e.g., total time of transmission, end time of transmission, and even time between transmissions. Obviously, if any of these attributes of a radio communication become accessible to a wrongful observer, the content of the transmission including the data of the transmission can be recorded.

Thus, each of these four parameters including the three meta data attributes and data content of a radio transmission are protected using the embodiments of the present application. It shall be understood that, while the present application expressly protects these forms of meta data from surveillable or noticeable exposure, any and other forms of meta data associated with a radio transmission or other susceptible forms of communication can be protected, such as any other indirect transmission signals from components of the communicating devices when processing signals, such as an RF amplifier and also, meta data information from a tuner or detector.

While cryptography can be used to strongly secure contents or data contents of a communication packet, it is difficult to apply cryptography to protect meta data attributes of a radio transmission, such as timing, power, and frequency (e.g., channel) being used in the transmission. Thus, the systems and protocols associated with the system and methods of the present application can be used to protect each of the above-noted parameters.

As mentioned previously, in the system(s) described herein below, there is a fundamental requirement that each of the nodes (e.g., autonomous devices) is able to perform full cryptography protocols without any intervention or assistance of a central authority or central connectivity server. This fundamental functionality of the nodes lends to the autonomous nature of the devices required in an IoT or DCoT of the future.

System for Secure and Private Connectivity

As shown in FIG. 1, a system 100 of a preferred embodiment of autonomous devices communicating securely and privately over radio frequency is disclosed. The system 100 preferably includes a plurality of nodes 110, a stateless configuration server 120, an external network 130, one or more routers 140. The system 100 can be used to implement Telehash protocols in combination with TMesh sub-protocols of Telehash to securely and privately perform communications between two or more nodes of the plurality of nodes 110. It shall be understood that while many of the embodiments of the present application implement communication with the decentralized communication network via radio frequency, it shall be understood that any communication method, including communication methods which does not rely on a central authority communication network to relay or communication information to another party. For instance, any short-range or long-range wireless interconnection technology may be implemented including Bluetooth, near-field communication (NFC), RFID, ANT+, any personal area network, infrared, Zigbee, low-power WiFi, and the like.

Figure 2:
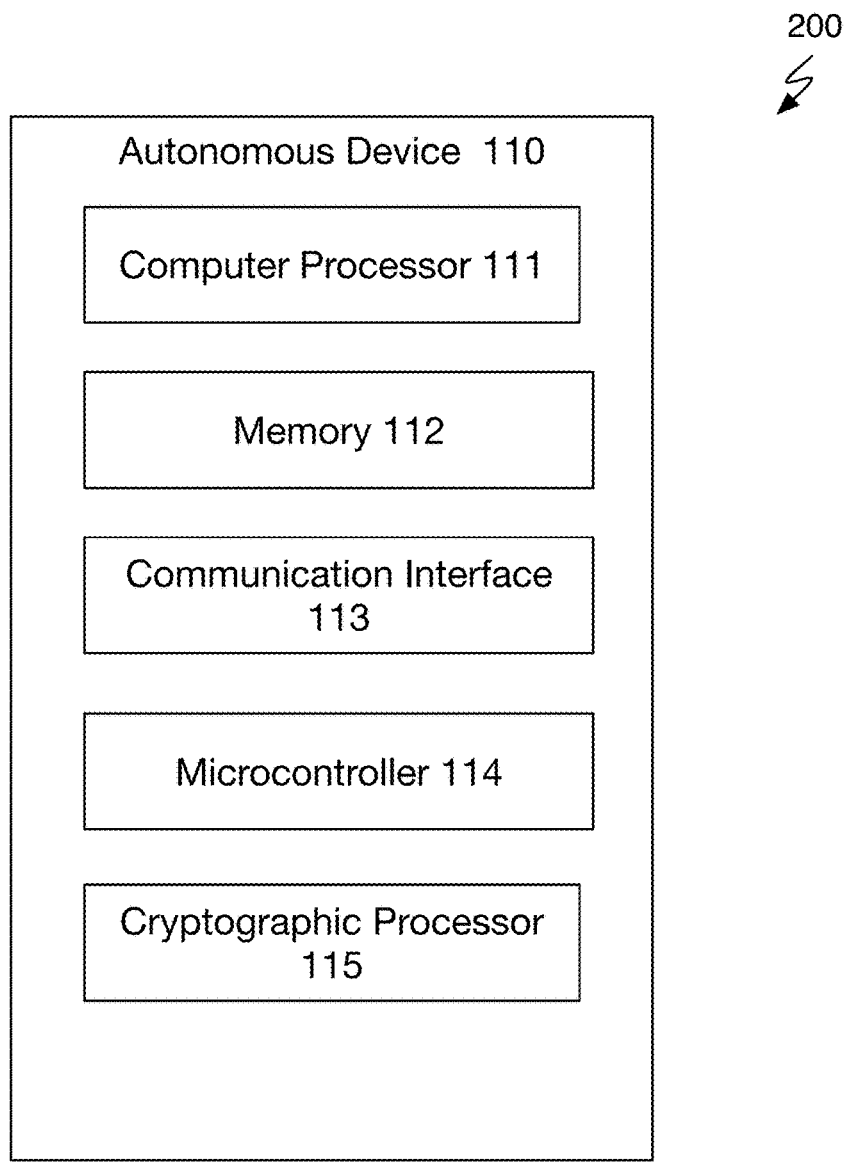
FIG. 2 is a schematic representation of a component of system of a preferred embodiment of the present application.

Each of the plurality of nodes 110 of system 100 may be any type of device, as illustrated by way of example in FIG. 2. For instance, each of the plurality of nodes 110 may be an autonomous device. An autonomous device of system 100 is preferably a device that is a principally independent actor from a central authority including any central server authority and including manufacturers of the autonomous device. That is, the autonomous device is able to manage all of its operations, transactions, access, transacting with other devices, an operational control of the device without intervention of a central authority outside of the physical device. Thus, the autonomous device retains full control and complete privacy at the device, itself, when in use and operation.

As shown in FIG. 2, each autonomous device forming a node of the plurality of nodes 110 of system 100 comprises one or more computer processors 111 (or a main processor 111), a memory 112, a communication interface 113. In one variation, each autonomous device includes a microcontroller 114 having a small computer on a single integrated circuit containing a processor core, memory, and programmable input/output peripherals. The microcontroller 114, in some embodiments, is used in lieu of the one or more computer processors 111 and in other embodiments, the microcontroller is used in conjunction with the one or more computer processors 111. Additionally, and/or alternatively, each autonomous device of the plurality of nodes 110 includes a cryptographic coprocessor 115 which is a hardware security module or component which provides high security and high-throughput cryptographic subsystems and a crypto-accelerator chip 116, which may be integrated with the cryptographic coprocessor 115. Each node 110 may also include a modulator 117, an oscillator 118, a timer/clock 119, and a power supply 120.

Each node 110 of FIG. 2 may also include traditional elements of a device configured for radio communication at the communication interface 113. Thus, the communication interface 113 of node 110 of a preferred embodiment includes a radio frequency (RF) scanner 121, RF transmitter 122, RF receiver 123, RF tuner 124, an antenna 125, and a RF amplifier 126.

The memory 112 of each node 110 in a preferred embodiment includes one or more computer-executable instructions and/or software applications with computer code for executing the functionality and protocols of DIST including Telehash and TMesh and any other functionality or protocols associated therewith, which are described herein required for secure and private communications by and between each of the plurality of nodes 110 and another node.

The cryptographic coprocessor 115 of each node 110 (e.g., autonomous device) is configured to implement various cryptographic processes including generating, managing, and storing cryptography keys and encrypting and decrypting cryptographically secured communications. Specifically, each autonomous device using the cryptographic coprocessor 115 is able to generate private/public cryptography key pairs that can be used to cryptographically secure communication links and sessions between at least two nodes.

The autonomous device forming a node of the plurality of nodes 110 may be any type of device, which may be coupled with one or more machines, instruments, components, and/or real world operational devices or elements to sense inputs and/or outputs thereof, to perform actuation operations of one or more components thereof, to perform transactions on behalf of the element or device to which the autonomous device is coupled, and the like. For example, in some embodiments, the autonomous device is a sensor that is able to obtain readings and other information relating to or about one or more devices to which the sensor is operably coupled and/or obtain readings about the environment of the one or more devices. Additionally, and/or alternatively, the autonomous device may be an actuator that performs and/or controls one or more actuation operations of a device to which the actuator is a component and/or is operably coupled to. In yet another example, the autonomous device may be a transaction device which brokers transactions on behalf of the device to which it is operably coupled and/or forms a component thereof. The transaction may include an exchange of value for a good, service, or other product offered to the autonomous device or the device to which the autonomous device is coupled. In such example, the autonomous device acting as a transaction device is able to negotiate with other devices and/or other autonomous devices to obtain resources for itself and the device to which it is coupled or provide resources from the device to which it is coupled for a negotiated value or the like from another device or party.

The stateless configuration server 120 of a preferred embodiment is configured to be used as a trusted third party for shared secrets used in cryptography and as an initialization and provisioning server for each of the plurality of nodes; however, it shall be noted that once in operation, each of the nodes are independent of the stateless configuration server 120 and do not rely on the server 120 for access and/or operational control support or management. Specifically, the shared secrets may be provisioned to one or more devices represented by nodes 110 in the system 100. The stateless configuration server is preferably a management server which may be used in a device/node deployment process. For example, the stateless configuration server 120 in a provisioning process is able to generate private/public cryptograph key pairs and provision each of the plurality of nodes 110 a public key pair defining who and/or which devices/nodes the provisioned device can trust. The autonomous devices/nodes can be provisioned online or offline. In offline provisioning, it is possible to provision the devices at initialization or at a time of manufacturing. Thus, online configuration through a communication network is not required and consequently, real-time access or connection to the server 120 is not required. In this way, it should be understood that the establishment of a cryptographic communication between two nodes of the plurality of nodes 110 is purely performed offline and without an outside accessible network (e.g., LAN, WAN, GAN, etc.) or central authority (e.g., a central/management server). The rationale for configuring the nodes to perform cryptographic functions without an area network or central authority is to reduce, if not, eliminate any requirements that the nodes will require intervention or assistance from an outside central authority, which may be used to compromise the node, thereby eliminating the need for a central authority or area network enhances the autonomous nature of the node.

The external network 130 of system 100 is a network outside of the mesh network formed by the plurality of nodes no and one or more routers 130. The external network 130 may be accessible to one or more of the plurality of nodes 110 for the purposes of establishing an external communication channel outside of the mesh network to another entity, party, or device. It shall be noted that the external network is not necessary for the proper operation and implementation of secure communications and the like in the mesh network formed by the plurality of nodes no and routers 140.

The external network 130 may be any type or kind of network that uses the Internet (e.g., GAN), WAN, LAN, or other centralized communication network to transmit and receive communications between parties.

The routers 140 of system 100 may be used in the mesh communication network to locate nodes in the mesh network in order to assist an initiating node in establishing a communication link with a requested node to be located. The routers 140 of system 100 may be configured identically to each of the plurality of nodes 110 and thus, each of the routers 140 may also be consider nodes and/or communication endpoints. Additionally, and/or alternatively, the routers 140 may be configured with additional node identification components and/or software enabling each of the routers 140 to easily locate additional and/or different nodes with the mesh network. For instance, at a time of manufacture or deployment, each of the routers 140 may be provisioned with a list of each of nodes with associated identifiers within the mesh network. The provisioning may also include a location of each of the nodes in the mesh network together with a schedule providing future relocation and/or new locations of each of the nodes. In this way, when a node no of the system 100 requires assistance, upon receiving at the router 140 information (e.g., node identifier) about a node or endpoint to be identified, the router 140 can refer to the list of nodes and/or compare the node information to the list in order to determine a location of the requested node and properly direct any communication from the initiating node and/or assistant in the establishment of a communication link between the initiating node and the requested node.

Accordingly, the system 100 functions to enable the plurality of nodes 110 and routers 140 to form a decentralized communication network, such as a mesh network, for performing highly secure communications without revealing any meta data about the secure communication within the mesh network and without the need for a central authority, such as one or more servers for brokering or facilitating any of the links between the nodes and establishing cryptographically secure channels of communications between the nodes. The decentralized communication network can take the form of a peer-to-peer communication network without any centralized authority or any centralized computing authority governing the communication establishment or maintenance of the peer-to-peer links.

Figure 3:
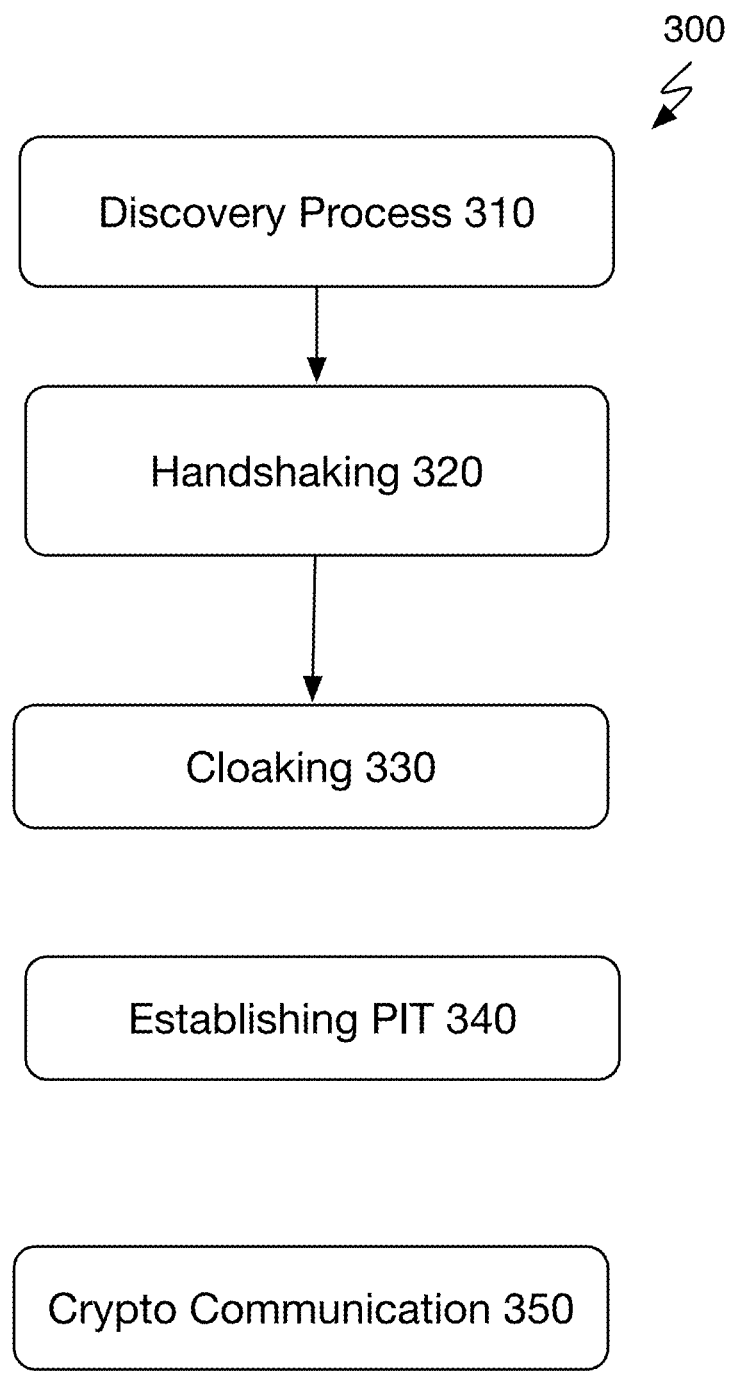
FIG. 3 is an example process flow of a method of a preferred embodiment of the present application.

Referring now to FIG. 3, a method 300 for implementing a zero meta data radio frequency communication in a decentralized communication network is described. The method 300 includes implementing a preliminary discovery process 305, a discovery process 310, implementing handshake process 320, implementing a cloaking process 330, establishing a point-in-time reference 340, and establishing cryptographically secure communication channel and communicating thereon 350.

While, in many embodiments of the present application, nodes or endpoints are provisioned out-of-band by a provisioning device and/or server (e.g., provisioning server 120) that imprints the nodes with information for discovering a mesh community or at least one or more other nodes in a mesh network, there are some instances in which nodes in an existing mesh network resets and loses its connections and shared cryptographic secrets for accessing the mesh community. In such instances, the reset node cannot readily be provisioned due to the lack of access to an external network or most likely because protocol for provisioning the node requires an out-of-band device or server (e.g., provisioning server 120). In other embodiments, a node may not have been reset but is a new node to be added to a mesh network that is establishing itself or is otherwise, preexisting.

Thus, prior to or contemporaneous with discovery and in the circumstances in which a node has reset or is otherwise, not yet discovered by any member node of mesh network community, a TMesh (e.g., Thing Mesh) preliminary discovery protocol is implemented at step 305 to bootstrap the connection of the undiscovered or reset node that is attempting to discover and join a network of other nodes. Accordingly, FIG. 4 illustrates a process flow 400 for implementing step 305 in order to join a reset node and/or an undiscovered node to a preexisting mesh network.

Figure 4:
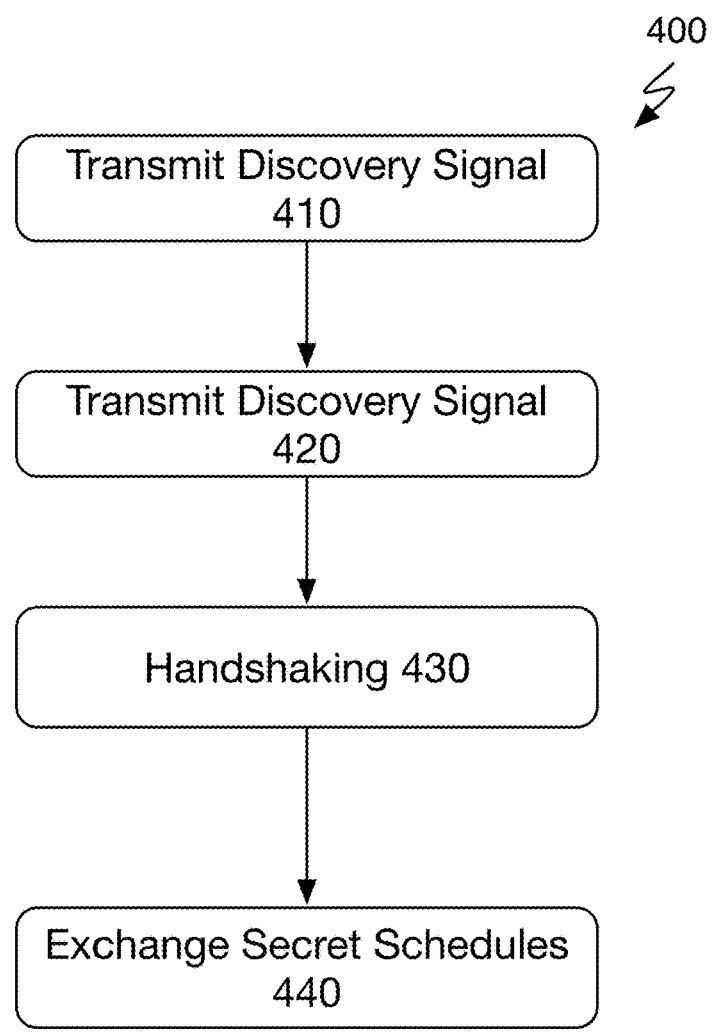
FIG. 4 illustrates an example process flow of a method of a preferred embodiment of the present application.

The bootstrapping process as illustrated in FIG. 4 is designed to maintain a same highly level of privacy and security to avoid the leakage of meta data in the bootstrapping process as is done in a normal secure communication or interaction between endpoints that involves Telehash and associated protocols. Generally, in order for the endpoints, in the decentralized communication networks disclosed herein, to establish operating communication links and the like it is often required that the endpoints in the network share some level of knowledge of their operation schedules. Thus, it is first necessary at the discovery stage or otherwise, that endpoints participating in a decentralized network identify one or more secret schedules of community endpoints to be able to anticipate windows and times at which it is possible to communicate with other endpoints in the community. The secret schedules of an endpoint or a node includes various information about the operation and communication preferences of a node. For instance, a node may one or more secret schedules which identify the node's communication scheme including the one or more prescribed times in a given period (e.g., a day) that the node is available to transmit a communication or receive a communication transmission, the node's sleep or wake schedule, the channels and/or windows in which the node communicates, and the like. Thus, when a node is operating on a secret schedule, the primary purpose of the schedule is to send out a signal on that schedule. The time at which the node sends the signal and the channel that the node uses to transmit the signal are random based on a secret or a pseudo-random number. Once the node shares the secret (e.g., key) to the schedule to other nodes, the other nodes can follow the schedule or pattern of the transmitting node to determine the time and channel at which the node will be transmitting a signal. However, when a node has been reset, the node's secret schedule has most likely been erased or lost and thus, other nodes would not be able to identify the node's communication and/or interaction preferences to successfully participate in a mesh network community. Similarly, when a node is new to a mesh network and the node's secret schedule is not available to a pre-existing mesh network community, it is necessary that the node be discovered and share its secret schedule in order to meaningfully participate in the mesh network community.

Accordingly, as an initial step 410, the node after reset or prior to being able to be discovered, the node may generate a random crypto key having an associated random timing parameters for transmitting a discovery signal and also, enables its discovery mode. Additionally, and/or alternatively, the node after boot up generates a new secret schedule since any secret schedule associated with the node is likely erased, lost, or is otherwise, unusable. The discovery mode, in most embodiments, may be a set of discovery parameters provisioned to a node which identifies a predetermined or standard discovery channel or frequency on which the node should transmit a discovery signal or communication. The reset node in a preferred embodiment transmits the discovery signal solely on the discovery channel and naturally, defaults to listening for other signals on that same discovery channel. Additionally, and/or alternatively, a community of nodes forming a mesh network, in some embodiments, may negotiate the parameters for discovery (e.g., random transmission times and channel) that any reset or lost device can use to transmit a discovery signal which would eventually be discovered by a member of the mesh network. However, when the discovery parameters are not prenegotiated in a mesh network community, it is also possible that the set of discovery parameters of the discovery mode are common to many, if not all, nodes since the parameters of discovery mode may have been provisioned to the many nodes at initialization or at a time of manufacture.

Thus, in the discovery mode the node attempting to be discovered transmits discovery signals either periodically or on a continuous basis on the predetermined discovery channel. Equally, the node listens for any signals and/or transmission on the discovery channel to determine whether or not an invitation (e.g., a request to handshake) to join the mesh network community is being transmitted or merely to determine whether another node is transmitting on the discovery channel.

At step 420, the reset node begins to transmit a discovery signal according to a random time table but on the discovery channel and similarly, the node would default to listening for transmissions on that same discovery channel.

At step 430, while transmitting on the discovery channel, if or when the reset nodes signal is discovered by another node or when the reset node discovers the transmission of a signal by a transmitting node, the nodes may begin handshaking, using Telehash handshaking protocols and the like, in order to negotiate parameters for establishing normal and/or secure communications between the two nodes. At a preliminary point-in-time at which the reception of the transmission signals from the transmitting node and transmission of the discovery signals of the reset node is completed or finished, the two nodes have a synchronized point-in-time useable to initiate handshaking.

At step 430, the two nodes use the synchronized point-in-time to start to transmitting signals for handshaking, such as a Telehash handshake. The handshake between the two nodes is encrypted and in a preferred embodiment, the handshake contains the permissions (e.g., cryptographic keys) transmitted from each node that when confirmed indicates that the two nodes are permitted to communicate with each other. Once the two nodes have determined that it is permissible to continue communicating, at the end or immediately after the handshaking process, in some embodiments, only then will the nodes share their secret schedules with each other. Thus, the permissions to communicate with each and/or the end of the handshaking process trigger the transmission of the secret schedule for each respective node involved in the handshaking process.

At step 440, once the handshaking is complete and the secret schedules of each of the nodes has been exchanged, the two nodes shortly thereafter discontinue (e.g., drop-off) communications on the discovery channel and proceed to store the exchanged secret schedules in their respective memories or the like. Accordingly, the reset node has been successfully re-established in the mesh network or if the reset node is a new node, then the new node would be successfully augmented to the existing mesh network.

Referring back to FIG. 3, when two nodes are participating in same mesh network but have not previously connected, at block 310, the at least two nodes attempt to identify a location and/or discover an identity of each other for the purposes of establishing a link and/or establishing a communication channel between them. In such embodiment, the two nodes do not have access to each other's secret schedule or permanent identities and thus, the two nodes must rely on one or more nodes in the mesh network formed by a plurality of nodes to establish a communication link with one another. Accordingly, when two nodes do not know any information about each other, such as identities or schedules (e.g., short-term or long-term identity, etc.), these two nodes may only know that each of the them trust a same third party (e.g., the stateless configuration server 120) and in other embodiments, the trusted third party may be a routing node which has a verified trusted relationship with the two nodes attempting to establish a communication link. The routing node may have access to the secret schedules of both nodes which are seeking communication, which allows the router to act as an intermediary for negotiating a handshake between the two nodes. The same third party (e.g., a provisioning server or the like), in some embodiments, is a provisioning device which provides to each node identities and cryptographic keys sufficient for identifying an unknown node in a mesh network or the like.

This discovery stage, at block 310, involving the discovery of the at least two nodes attempting to establishing a link must be secured to protect the identities of the two nodes from observation and capture or otherwise, to avoid revealing which nodes of a plurality of nodes (e.g., three or more nodes) in a mesh network are communicating to each other over radio. In the discovery stage at 310, the two nodes are seeking to learn and/or obtain the permanent identities of the other respective node that is attempting the link.

Referring now to block 320, at this block, once the two nodes are able to successfully discover one another via a router or otherwise (e.g., using provisioning information), the two nodes implement a handshaking process to negotiate communication parameters. The information exchanged during the handshaking process is cryptographically secure and in many cases, includes the secret schedules and permanent identities of the handshaking nodes. In some embodiments, upon receipt of the secret schedule of the oppositely communicating nodes, each of the respective nodes will use the secret schedules to establish a secure communication according to the parameters of the secret schedules. Once the secure session is established between the two nodes, the secure session has zero meta data qualities in which no useful meta data surrounding the contents of the radio transmission can be captured by a party observing the radio transmission because the channel and time of communication between the two nodes becomes random. Thus, meta data qualities, such as time and frequency/channel for communicating cannot be detected by an observer of the two nodes.

The discovery process of block 310 and handshaking process of block 320 of a preferred embodiment progress together. Each node of the plurality of nodes (e.g., more than two nodes) is configured with a long-term/permanent identity and a short-term/ephemeral identity where the long-term identity of the node is never revealed to the public with very limited exceptions where the node is specifically provisioned to expose such data. Referring back to the discovery process of block 310, the discovery process between two nodes is only required once for the two nodes to learn of each other's permanent identities and/or secret schedules. Knowledge of the permanent identities of the two nodes is required for continued communications between the nodes during and/or after the handshaking process of block 320.

Specifically, at a provisioning step partly described with respect to the stateless configuration server 120 of system 100, each of the nodes in the plurality of nodes are provisioned with instructions indicating a number of identities (e.g., ephemeral and permanent identities) of other nodes which are authorized to perform a set of actions and/or is authorized to establish a secure link over radio frequencies. Thus, at the time of provisioning or imprinting of the nodes, each node is provisioned with a public key or set of public keys that have permissions and one of those permissions is to enable discovery of other devices. Thus, if the two nodes have the proper cryptographic public keys that provide permissions for each node to discover the other respective node and continue communications, then the two nodes should be able to at least discover an ephemeral identity of each other. The ephemeral identities of the two nodes may be based on or otherwise, derived from one or more of the cryptographic public keys having permissions for discovery.

The handshaking process of block 320 of a preferred embodiment further implements forward secrecy, which is a cryptographic key-exchange protocol that involves generating ephemeral public/private cryptographic key pairs or the like to negotiate a shared secret between two nodes. Thus, at a time of handshaking between two nodes, one or both of the nodes will generate an ephemeral identifier (e.g., a public key), which may be paired with a generated private key or a permanent private key in order to form a cryptographic key pair. Additionally, and/or alternatively, the two nodes may only generate ephemeral identifiers (e.g., public keys) which pair with their pre-existing permanent identifiers (e.g., private keys). Thus, during the handshake, one or both of the nodes will transmit the ephemeral identifier to the other node and receive a return message encrypted with said ephemeral identifier. In some embodiments, both nodes receive an encrypted message; however, for purposes of clarity and simplicity, it is assumed that only one node sends the generated ephemeral identifier and in turn, receives a message from the other node that was encrypted using the transmitted ephemeral identifier. Upon receipt of the encrypted message, the node that sent the ephemeral identifier would decrypt the message using its permanent identifier (e.g., the generated or permanent private key/identifier). Upon successfully decrypting the encrypted message using the permanent identifier, the content of the decrypted content of the encrypted message is used as a shared secret that only the two nodes know and can use for participating in a single new communication session following the completion of the handshake.

Additionally, and/or alternatively, the two nodes in order to cryptographically generate, at the time of handshaking, ephemeral identifiers for each of the two nodes. The generated ephemeral identifiers for each of the two nodes may then be used in combination with the private keys of each respective node to further generate a shared secret to be used in maintaining a secured communication session between the two nodes. After generating the shared secret for the cryptographically secured communication between the two nodes, the generated ephemeral identifiers of the two nodes are discarded or otherwise, destroyed. In this way, even if an observer is able to record or capture the encrypted data in a secured session and at a later time has access to or can break the cryptography of the communication session of the two nodes (e.g., the endpoints) to obtain private key information of the two nodes, then the observer may be able to decrypt encrypted data being communicated between the two nodes in the future, which uses the very same keys (e.g., public/private key pairs). While the observer may be able to decrypt encrypted communication sessions in the future between two nodes, the observer is only able to impersonate a legitimate node moving forward based on having accessing to the private key associated with the legitimate node. However, the observer impersonating the legitimate node would not be able to use the obtained private key information to decrypt previous or past sessions because the ephemeral public key used in establishing the shared secret for the past or previous secure communication session between the two endpoints were discarded and new and different ephemeral keys are needed for a subsequent and/or future secured communication session.

Thus, using the perfect forward secrecy technique of the handshaking process at black 320 prevents compromise of past and future cryptographically secured communication sessions between the two endpoints. As mentioned above, this is, of course, because the shared secret and/or ephemeral key information used in the previous session were destroyed or discarded during and/or after the handshaking process. Accordingly, even if the private key information is obtained illegitimately, in a future communication session the two nodes would mostly use a different set of public/private keys, which would render the improperly obtained private key from the prior communication session obsolete or useful for observing future communications.

Once the handshaking process at block 320 is completed and an encrypted session between the two endpoints (e.g., two nodes) is established, an encrypted data masking/cloaking process is implemented at block 330 that masks the transmission of the encrypted data packets between the two endpoints without revealing that the two endpoints are communication. Specifically, an aim of the masking/cloaking protocols of TMesh is to mitigate the meta data associated with the transmissions of the two communicating endpoints. Some of this meta data may be in the form of increased power usage of all the nodes in the mesh network. Thus, the TMesh protocol affects the communicating nodes and possibly all nodes in the mesh in one or more manners that disguise transmitting and/or communicating nodes. Of course, an assumption at block 330 is that there are a plurality of nodes or endpoints in the mesh network equaling three or more nodes, because if there were only two it would be obvious to a wrongful observer which endpoints are communicating for the purpose of making a pointed effort to observe and record the interaction between the two endpoints.

Accordingly, in the mesh network that includes the communicating nodes and a plurality of other nodes, the cloaking process causes the power usage of each node to be the same or substantially the same such that it is not obvious that any node in the plurality of nodes may be communicating because the power usage does not change when nodes in the mesh network begin to communicate. That is, even when two nodes are communicating, their power usage will match the power usage of one or more other nodes in the mesh network or otherwise, which are not communicating. Thus, a uniform power masking cloak is implemented to obfuscate active nodes. Thus, in such embodiment, the cloaking process may cause the nodes to emit power usage readings greater than what is required for establishing a link and communicating. In this way, the energy required for communicating can be masked within the overall energy being used at each of the nodes. In such instance, each of the nodes may emit a power reading of P1 and only use a power amount of P2, which is less than P1. Thus, an additional or superfluous or extraneous power amount is consumed of P3, where P3=P1−P2. Accordingly, P3 is the difference between the power amount being emitted at a node and the amount of power actually being used at a node for operational purposes, including communicating with another node.

Additionally, and/or alternatively, the cloaking process may cause randomized power outputs at the nodes or cause random power readings across each of the nodes so that it is not clear to a wrongful observer, which of the nodes are actually communicating and which of the nodes are not communicating because high and low power readings of the nodes in the mesh network would not be a definitive indicator of operation or communication. Rather, the random power readings of each node would operate to confuse or trick a wrongful observer to believe that a node having a high power reading is communicating when, in most circumstances, the node is not communicating or otherwise, performing any additional operations that would require the power output.

It shall be understood that the uniform power generation, increased power usage techniques, and randomized power techniques of TMesh protocol can be applied to measurable output of the nodes. For instance, the same TMesh techniques can be applied to signal strength resulting in uniform signal generation, increased signal usage techniques, and randomized signal production techniques to obfuscate the signals of communicating or active nodes.

It shall also be understood that the TMesh techniques of uniform power generation, increased power, and randomized power techniques can be combined with each other and additionally, with other measurable output parameters affected using TMesh in an increased effort to disguise meta data in the mesh network.

Additionally, and/or alternatively, in a typical radio communication, a frame header is provided with the communication packet from a node that describes the contents of the packet. Thus, there are always a few bytes of meta data in the form of a frame header that is transmitted in a traditional radio communication scheme and these few bytes of information in the frame header is sent without encryption or with a single shared secret of encryption that every device in the network may have. Thus, if the shared secret is compromised, then anyone can read the information in the frame headers.

Accordingly, the masking process at block 330 is additionally, and/or alternatively used to prevent even information in a frame header of a communication packet that includes encrypted data from being revealed. A challenge with radio communication, however, is that a receiver (e.g., endpoint) of a radio communication usually does not know who sent a communication packet because the receiver is merely recording a transmission and without any information other than the signal, itself, and the fact that the receiver is receiving a transmission. Thus, when an endpoint is using an encrypted session among a plurality of other nodes, the endpoint receiver must have information about the transmitting node in order to decrypt the encrypted communication packet. The assumption, in such case, is that the encrypted communication is intended solely for the receiver and only the receiver maintains the shared secret associated with an identity of a transmitting node in order to decrypt the communication packet. The frame header usually provides the necessary information for processing the communication packet from a transmitting node. Example information included in the header, other than a sender identifier, includes the error correcting rate, CRC, a length of the message, a nonce for packet encryption, and generally data that the receiver requires to understand the data that was transmitted in order to decode the transmission. After reading the information in the frame header, a general receiver would transmit the communication packet to a software application to decrypt the communication packet in accordance with the information obtained in the frame header.

At block 330, in the masking process of a preferred embodiment, no frame header is included or otherwise, sent with an encrypted communication packet. Rather, the masking process of block 330 requires transmitting encrypted communication packets in fixed lengths (e.g., 64 bytes of fixed length) among all the communications between nodes in the plurality of nodes and not variable length data packets in which the amount of bytes of data varies between transmissions between two nodes. Also, if there is a frame size provided, block 330 preferably makes the frame size a fixed size among all of the frame sizes used in communications between all of the nodes. In this way, if there is a meta data collector, the collector cannot determine message sizes or lengths and thus, it is preferable to eliminate message lengths and frame sizes from the header.

Additionally, the masking process at block 330 uses one or more pre-negotiated mediums that include information that would typically be included in a frame header and any information and/or configuration parameters that a receiver of an encrypted communication packet without a frame header requires for decrypting the encrypted communication packet. The pre-negotiated mediums of a preferred embodiment include one or more of error correcting code, fixed message length, fixed frame size, and the like. While one or more pre-negotiated mediums can be exchanged between the nodes in some embodiments, the pre-negotiated or predetermined mediums are preferably not exchanged between the two endpoints, to avoid incidental disclosure, but rather the pre-negotiated mediums are preconfigured or provisioned (e.g., via the stateless configuration server 120) to each of the endpoints or otherwise, the pre-negotiated mediums are pre-known out of band. Additionally, the pre-negotiated mediums can be self-generated by the nodes and/or changed periodically throughout the life of the node. Essentially, because the communication packets do not have frame headers, the pre-negotiated mediums provide the necessary information that a frame header would normally provide to the decryption software application, most likely residing on a cryptographic coprocessor or a memory associated with each node, to decrypt the encrypted communication packet.

Additionally, and/or alternatively, two endpoints performing a handshaking session may also identify and agree on their respective pre-negotiated mediums that will be used for decrypting an encrypted payload transmitted between the two endpoints. The two nodes can alternatively identify and agree upon a pre-negotiated medium to use by providing the identifier during the secure encrypted session after handshaking. In some embodiments, each of the respective nodes hosts or have stored thereon a plurality of pre-negotiated mediums with information necessary for decrypting communication packets and thus, between two nodes an agreement as to which of the plurality of pre-negotiated mediums will be used. In such embodiments, each of the nodes will have one or more of the same pre-negotiated mediums. In this way, the nodes may identify or may select and agree on the same pre-negotiated medium to use for decrypting communication packets. In this pre-negotiated (pre-set) medium confirmation process during handshaking, the pre-negotiated mediums, themselves, are not transmitted but merely an identifier of the pre-negotiated mediums are compared or otherwise, exchanged sufficiently to enable confirmation of which pre-negotiated medium will be used.

At block 340, a point-in-time reference parameter is identified during and/or contemporaneous with the handshaking process. Thus, not only is a shared secret generated or identified for the two endpoints that are communicating during the handshaking process between the two endpoints but also a point-in-time reference or timestamp is identified to be used as a reference by the two endpoints to continue communicating. Specifically, the point-in-time reference or timestamp may be used by the two endpoints to identify a common position in a community rhythm shared by the nodes in the mesh network or simply, a common operational rhythm that is shared by the two nodes.

The rhythm may be a time-based reoccurring sequence or pseudo-random pattern that can be used to identify a common window session and/or sequence session after a PIT reference parameter has been determined.

Once the common position in the random sequence and/or random rotating window sequence is established, the communication parameters at the common position in the sequence and/or the communication parameters at the common window and following can be used to define cryptographic code or other parameters, such as communication timing communication frequency to be used in the communications between the two nodes, which is explained a bit further below.

In some embodiments, the point-in-time reference parameter for the two endpoints is set at the beginning of the handshaking process, immediately after discovery. Additionally, and/or alternatively, the point-in-time reference parameter for the two endpoints is set at the end of the handshaking process. It shall be understood that a plurality of point-in-time (PIT) reference parameters may be identified randomly and jointly by the endpoints during the handshaking process between two endpoints and the endpoints may selectively choose one of the PIT reference parameters to use in their continued communications. In some embodiments, the two endpoints may associate sequential identifiers (or even non-sequential identifiers) with each of the plurality PIT references parameters identified during a handshaking process. The sequential identifier would be associated with a PIT reference parameter, as the PIT reference parameter is identified during a time handshake, such that firstly identified PIT reference parameter could be associated with 1 or A and a secondly occurring identifier could be associated with 2 or B. The endpoints may selectively identify a PIT reference parameter of the plurality of PIT reference parameters by providing or sharing one of the sequential identifiers associated with one of the PIT reference parameters. Thus, without having to specifically identify the point-in-time that will be used as a reference for establishing normal communication parameters following the handshake, the two nodes can further disguise the selection of a PIT reference parameter by simply providing one of the sequential identifiers, which the receiving node uses to recall or identify the corresponding PIT reference parameter occurring during the handshake process.

Specifically, the encrypted session between the two endpoints is conducted in accordance with a session window or session sequence among several session windows or session sequences. Thus, there are a plurality of session windows or session sequences provided between a minimum and maximum value, which is identified in the pre-negotiated mediums set to each endpoint. Each session window or session sequence is continually revolving or rotating within the minimum and maximum value throughout the handshaking process and preferably, throughout the operation of each endpoint. In such embodiments, each of the plurality of endpoints, including the two communicating endpoints, share a common rhythm which follows the timing of the revolving of the session windows or session sequences. Accordingly, in a preferred embodiment, each endpoint of the plurality of endpoints is aware or has knowledge of which session window or session sequence is actively available for continued communications between two endpoints because all of the endpoints share the common rhythm and are therefore aware of the pseudo random nature of the rotation of the windows and sequences. The common rhythm of the endpoints may be provisioned or programmed to each node such that the common rhythm follows the clock/timer of each device where each clock/timer of each node is set in the same manner. Accordingly, each node may be programmed with a same clock and/or timer which incorporates the common rhythm. The session windows and/or the session sequences, as mentioned above, identify one or more parameters for continued communication. The one or more parameters may include an identification of a cryptographic method or code for continued encryption of the communication session, a timing for sending and/or receiving communication packets, a power usage setting for each of the nodes, during of the communication session, and the like.

Thus, the session window in which a communication between the two endpoints may be continued is generally random; however, according to the process of block 340, a point-in-time is established which both endpoints use to set the session window, which will be used for continued encrypted communication. Specifically, with the PIT reference parameter identified during a handshaking session, each of the endpoints apply the PIT reference parameter to the common rhythm of the endpoints in order to identify the session window which corresponds to the point-in-time of the rhythm. In this way, a single active session window corresponding to the point-in-time in the rhythm is identified by both endpoints and is subsequently used by both endpoints to facilitate the encrypted communication channel. For example, if the two endpoints are pre-programmed to establish a point-in-time at the end of a handshaking session and the handshaking session ends at 1:05 am, then each endpoint will apply the 1:05 am point-in-time reference parameter against a predetermined common rhythm shared by both endpoints. In this example, five session windows including session window (SW) 1, SW 2, SW 3, SW 4, and SW 5 are continually rotated within a specific time frame and the rotation schedule is a known rotation schedule or forms a known rhythm to each of the endpoints. According to this example, if SW 3 was the active session at 1:05 am, each of the endpoints would apply the PIT 1:05 am to the known rotation schedule or rhythm to identify the active window they should use in their encrypted conversation.

It shall be also noted that the channel (e.g., frequency) of communication may also be random and operate in accordance with rhythmic rotation schedule similar to or different from the schedule of the session windows. Thus, the PIT reference parameter may also be used to identify the channel for continued communications between the two endpoints after completion of the handshaking process.

Additionally, and/or alternatively, the act of sending or receiving may be established in accordance with the identified session window for the two endpoints. Thus, the act of sending and receiving by the endpoints of a preferred embodiment is not established until after the session window is identified using a selected or identified PIT reference parameter.

Additionally, and/or alternatively, the power levels used by each of the endpoints which are communicating may also vary randomly in accordance with the identified session window for the two endpoints. Thus, while in some instances high or low power levels between two end points may be used to send encrypted packets of data, these high or low power levels are randomly replicated without sending any encrypted packets of data between the endpoints. In this way, the power level usage appears to be random because they power levels of the endpoints are not strictly tied to the actual power required for sending and receiving encrypted data packets.

At block 350, once a session window or session sequence is identified, the two endpoints are configured to establish a communication channel in which the two endpoints communicate in accordance with the parameters identified in the session window or session sequence, which includes using the prescribed timing for transmitting and receiving communications and one or more frequencies for sending and receiving said communications.

As a result of the above process, from the perspective of an outside observer, time of transmission, power of transmission, and frequency of transmission appears to all be random such that definitive meta data parameters for identifying two end points communicating encrypted data is very difficult, if not impossible to identify.

The system and methods of the preferred embodiment and variations thereof can be embodied and/or implemented at least in part as a machine configured to receive a computer-readable medium storing computer-readable instructions. The instructions are preferably executed by computer-executable components. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the various system components and the various method processes.

As a person skilled in the art will recognize from the previous detailed description and from the figures and claims, modifications and changes can be made to the preferred embodiments of the invention without departing from the scope of this invention defined in the following claims.

We claim:

1. A system for secure communications in a decentralized mesh communication network operating without a central authority, the system comprising:
   a plurality of nodes, each of the plurality of nodes having, at least:
   (i) a communication interface implementing one or more communication protocols for decentralized communication in the mesh network, wherein the one or more communication protocols incorporate strong encryption attributes and are implemented without a central server authority, and
   (ii) a cryptographic co-processor configured to:
      (a) implement a handshake with one other of the plurality of nodes, wherein the two nodes in the handshake share a common rhythm based on an internal clock of each node;
      (b) establish a point-in-time reference parameter during the handshake, wherein the point-in-time reference parameter is identified at the end of the handshake with the one other node;
      (c) identify a window in a sequence of randomly rotating windows based on the point-in-time reference parameter, wherein the identified window contains a channel for conducting an encrypted communication with the one other node, wherein the window corresponds to the point-in-time of the common rhythm of the two nodes, and wherein identifying the window comprises applying the point-in-time reference parameter to the common rhythm of each of the nodes; and
      (d) establish the communication channel with the one other node.

2. The system of claim 1, wherein the communication protocol for decentralized communication comprises a protocol configured to establish encrypted, private communication between two endpoints.

3. A method for implementing secure and private radio communication between autonomous devices operating in a decentralized network, the method comprising:
   at a cryptographic processor of an autonomous device:
   implementing a handshake with one other of the plurality of autonomous devices, wherein the two autonomous devices in the handshake share a common rhythm based on an internal clock of each autonomous devices;
   establishing a point-in-time reference parameter during the handshake, wherein the point-in-time reference parameter is identified at the end of the handshake with the one other autonomous device;
   identifying a window in a sequence of randomly rotating windows based on the point-in-time reference parameter, wherein the identified window contains a channel for conducting an encrypted communication with the one other autonomous device, wherein the window corresponds to the point-in-time of the common rhythm of the two autonomous devices, and wherein identifying the window comprises applying the point-in-time reference parameter to the common rhythm of each of the autonomous devices; and establishing the communication channel with the one other autonomous device.

4. A non-transitory computer-readable medium comprising computer-executable instructions that when executed by one or more of a processor and a cryptographic processor, causes the one or more of the processor and the cryptographic processor to perform:

implementing a handshake with one other of the plurality of nodes, wherein the two nodes in the handshake share a common rhythm based on an internal clock of each node;

establishing a point-in-time reference parameter during the handshake, wherein the point-in-time reference parameter is identified at the end of the handshake with the one other node;

identifying a window in a sequence of randomly rotating windows based on the point-in-time reference parameter, wherein the identified window contains a channel for conducting an encrypted communication with the one other node, wherein the window corresponds to the point-in-time of the common rhythm of the two nodes, and wherein identifying the window comprises applying the point-in-time reference parameter to the common rhythm of each of the nodes; and establishing the communication channel with the one other node.

5. The system of claim 1, wherein the randomly rotating windows rotate in a pseudorandom fashion.

6. The system of claim 1, wherein each of the nodes applies the point-in-time to the common rhythm to identify the active window the nodes should use in an encrypted conversation.

7. The system of claim 1, wherein the communication channel between the nodes is random and operates in accordance with the rotation schedule of the randomly rotating windows.

8. The system of claim 1, wherein sending and receiving by the nodes is not established until after the session window is identified using the point-in-time reference.

9. The system of claim 1, wherein each of the nodes comprises an autonomous device that is discrete and independent from other nodes.

10. The system of claim 1, wherein the one other node is one of: a reset node or an undiscovered node.

11. The system of claim 1, wherein the one other node actively monitors for a signal comprising an invitation to join the mesh communication network.

12. The system of claim 11, wherein the one other node transmits one or more discovery signals on a predetermined channel, the discovery signals each comprising a request to join the mesh communication network.

13. The system of claim 1, wherein implementing the handshake comprises negotiating a shared secret between the two nodes based on a cryptographic key pair.

14. The system of claim 1, wherein the cryptographic co-processor is further configured to mask the transmission of encrypted data packets between the two nodes.

15. The method of claim 3, wherein the randomly rotating windows rotate in a pseudorandom fashion.

16. The method of claim 3, wherein each of the nodes applies the point-in-time to the common rhythm to identify the active window the nodes should use in an encrypted conversation.

17. The method of claim 3, wherein the communication channel between the nodes is random and operates in accordance with the rotation schedule of the randomly rotating windows.

18. The method of claim 3, wherein sending and receiving by the nodes is not established until after the session window is identified using the point-in-time reference.

19. The method of claim 3, wherein implementing the handshake comprises negotiating a shared secret between the two nodes based on a cryptographic key pair.

20. The method of claim 3, further comprising:
masking the transmission of encrypted data packets between the two nodes.

* * * * *